US008953671B2

(12) United States Patent
Liao et al.

(10) Patent No.: US 8,953,671 B2
(45) Date of Patent: Feb. 10, 2015

(54) CODEC CAPABILITY NEGOTIATION METHOD AND TERMINAL THEREOF

(75) Inventors: Kai Liao, Shenzhen (CN); Dong Wang, Shenzhen (CN); Xi Zuo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 250 days.

(21) Appl. No.: 13/513,050

(22) PCT Filed: Feb. 16, 2011

(86) PCT No.: PCT/CN2011/071035
§ 371 (c)(1),
(2), (4) Date: May 31, 2012

(87) PCT Pub. No.: WO2011/127763
PCT Pub. Date: Oct. 20, 2011

(65) Prior Publication Data
US 2013/0022100 A1 Jan. 24, 2013

(30) Foreign Application Priority Data

Apr. 15, 2010 (CN) .......................... 2010 1 0149192

(51) Int. Cl.
*H04N 7/12* (2006.01)
*H04N 11/02* (2006.01)
(Continued)

(52) U.S. Cl.
CPC ................ *H04L 67/34* (2013.01); *H04L 69/24* (2013.01); *H04L 65/1069* (2013.01)
USPC ................. 375/240.01; 375/E7.026

(58) Field of Classification Search
CPC . H04N 7/50; H04N 7/26271; H04N 7/26244; H04N 9/8042; H04N 5/85
See application file for complete search history.

(56) References Cited

U.S. PATENT DOCUMENTS

2008/0317065 A1* 12/2008 Chen et al. .................... 370/469

FOREIGN PATENT DOCUMENTS

| CN | 1870639 A | 11/2006 |
| CN | 101141682 A | 3/2008 |

(Continued)

OTHER PUBLICATIONS

English-language abstract of Chinese Patent No. CN 1870639 A, European Patent Office, Nov. 29, 2006.

(Continued)

*Primary Examiner* — Dave Czekaj
*Assistant Examiner* — Nam Pham
(74) *Attorney, Agent, or Firm* — DASCENZO Intellectual Property Law, P.C.

(57) ABSTRACT

The present invention provides a codec capability negotiation method and terminal thereof. The method includes: storing a negotiation identifier used for indicating whether negotiation is completed in a first terminal and setting the negotiation identifier as negotiation being uncompleted; an encoder of first tell final encoding media data by using a baseline algorithm and then transmitting the encoded media data, and the transmitted data packets carry an encoding algorithm capability set supported by codec of first terminal at the utmost and an indication of negotiation being uncompleted for second terminal to obtain the negotiated encoding algorithm, which is an intersection of encoding algorithm capability sets; when receiving data packets which are transmitted by second terminal and carry the negotiated encoding algorithm and the indication of negotiation having been completed, a decoder of first terminal notifies the negotiated encoding algorithm to encoder and sets the negotiation identifier as negotiation having been completed.

7 Claims, 4 Drawing Sheets

(51) Int. Cl.
*H04N 11/04* (2006.01)
*H04L 29/08* (2006.01)
*H04L 29/06* (2006.01)

(56) References Cited

FOREIGN PATENT DOCUMENTS

| CN | 101616494 A | 12/2009 |
|---|---|---|
| WO | WO 2008/026094 | 3/2008 |

OTHER PUBLICATIONS

English-language abstract of Chinese Patent No. CN 101141682 A, European Patent Office, Mar. 12, 2008.

English-language abstract of Chinese Patent No. CN 101616494 A, European Patent Office, Dec. 30, 2009.

* cited by examiner

CODEC CAPABILITY NEGOTIATION METHOD AND TERMINAL THEREOF

TECHNICAL FIELD

The present invention relates to information negotiation technologies, and in particular, to a codec capability negotiation method and a terminal thereof.

BACKGROUND OF THE RELATED ART

During an audio or video call between terminals via a digital network, a large number of audio or video data packets will be produced. In order to be able to improve network bandwidth utilization and increase network call capacity, a compression process is usually performed on original audio or video data by using an encoding algorithm firstly at a transmitting terminal, and then the compressed audio or video data is transmitted to the network; and after receiving the data packets, a receiving terminal needs to perform a decompression process on the data by using a decoding algorithm corresponding to the encoding algorithm of the transmitting terminal, to restore the audio or video data.

Each terminal using this mode of communication has one codec, and which encoding type (for example, audio encoding types such as G.711, G.726, G.729 and so on, and video encoding types such as H.263, H.264, MPEG-4 and so on) to be used between terminals is primarily negotiated by means of signaling.

In a variety of encoding standard specifications, in addition to an encoding algorithm mandated to be implemented by the specifications (i.e. a baseline algorithm), there are some optional encoding algorithms (such as an unrestricted motion vector mode, a segmentation filter mode and so on described in the H.263 encoding standard specification appendix), which can enhance the encoding efficiency, enhance the fault tolerance, improve the quality of audio or video communications, but have higher requirements for capabilities of codec.

As capabilities of codec used by various terminals are different, in order to be able to ensure the compatibility of various terminals, the capabilities of the codec need to be negotiated, but in the related art, the capabilities of the codec are negotiated by means of signaling, which needs additional signaling interaction. Alternatively, the encoding algorithm mandated to be implemented by the encoding standard specifications is used in both audio and video communications; however, after using the mode, it is impossible to enhance the quality of the communication by using the optional encoding algorithm in the specifications during communication between some terminals having codecs with higher capabilities, which greatly reduces the flexibility of the encoding algorithm selection and is yet to be improved and developed.

SUMMARY OF THE INVENTION

The purpose of a certain embodiment of the present invention is to provide a codec capability negotiation method and a terminal thereof, which are used to enhance flexibility of encoding algorithm selection, improve quality of audio or video communication and enhance user experience of the terminal by means of a codec capability self-negotiation in audio or video communication between terminals via a digital network.

In order to implement the above purpose, a certain embodiment of the present invention provides a codec capability negotiation method, comprising:

storing a negotiation identifier which is used for indicating whether negotiation is completed in a first terminal and setting the negotiation identifier as the negotiation being uncompleted;

an encoder of the first terminal encoding media data by using a baseline algorithm and then transmitting the encoded media data, the transmitted data packets carrying an encoding algorithm capability set supported by a codec of the first terminal at the utmost and an indication of the negotiation being uncompleted for a second terminal to obtain the negotiated encoding algorithm and encode the media data by using the negotiated encoding algorithm and then transmit the encoded media data, wherein, the negotiated encoding algorithm is an intersection of the encoding algorithm capability sets supported by the codecs of the first terminal and the second terminal at the utmost, and the data packets transmitted by the second terminal carry the negotiated encoding algorithm and an indication of the negotiation having been completed;

when receiving the data packets which are transmitted by the second terminal and carry the negotiated encoding algorithm and the indication of the negotiation having been completed, a decoder of the first terminal notifying the negotiated encoding algorithm to the encoder and setting the negotiation identifier as the negotiation having been completed.

Preferably, the above codec capability negotiation method further comprises:

after receiving the data packets which are transmitted by the second terminal and carry the negotiated encoding algorithm and the indication of the negotiation having been completed, the decoder of the first terminal performing decoding by using the negotiated encoding algorithm.

Preferably, the above codec capability negotiation method further comprises:

when performing encoding, the encoder of the first terminal encoding the media data by using the negotiated encoding algorithm and then transmitting the encoded media data if the negotiation identifier indicates that the negotiation has been completed, and the transmitted data packets carrying the negotiated encoding algorithm and the indication of the negotiation having been completed.

Preferably, the above codec capability negotiation method further comprises:

when receiving the data packets which are transmitted by the first terminal and carry the indication of the negotiation being uncompleted, the second terminal performing decoding by using the baseline algorithm; and when receiving the data packets which are transmitted by the first terminal and carry the indication of the negotiation having been completed, the second terminal performing decoding by using the negotiated encoding algorithm.

In the above codec capability negotiation method, the negotiated encoding algorithm and the encoding algorithm capability set supported by the codec at the utmost are carried by an encoding header of the transmitted data packets; and the indication of the negotiation having been completed and the indication of the negotiation being uncompleted are carried by a packet header of the transmitted data packets.

In order to implement the above purpose, a certain embodiment of the present invention further provides a codec capability negotiation method, comprising:

storing a negotiation identifier which is used for indicating whether negotiation is completed in a second terminal and setting the negotiation identifier as the negotiation being uncompleted;

when receiving the data packets which are transmitted by a first terminal and carry an encoding algorithm capability set supported by a codec of the first terminal at the utmost and an indication of the negotiation being uncompleted, a decoder of the second terminal calculating an intersection of encoding algorithm capability sets supported by codecs of the first terminal and the second terminal at the utmost to obtain the negotiated encoding algorithm, and notifying the negotiated encoding algorithm to an encoder of the second terminal and setting the negotiation identifier as the negotiation having been completed; and the encoder of the second terminal encoding media data by using the negotiated encoding algorithm and then transmitting the encoded media data, and the transmitted data packets carrying the negotiated encoding algorithm and the indication of the negotiation having been completed for the first terminal to obtain the negotiated encoding algorithm.

Preferably, the above codec capability negotiation method further comprises:

when receiving the data packets which are transmitted by the first terminal and carry the indication of the negotiation being uncompleted, the second terminal performing decoding by using a baseline algorithm.

Preferably, the above codec capability negotiation method further comprises:

after obtaining the negotiated encoding algorithm, the first terminal setting the negotiation identifier stored in the first terminal as the negotiation having been completed, and encoding the media data by using the negotiated encoding algorithm and then transmitting the encoded media data, and the transmitted data packets carrying the negotiated encoding algorithm and the indication of the negotiation having been completed.

Preferably, the above codec capability negotiation method further comprises:

when receiving the data packets which are transmitted by the first terminal and carry the indication of the negotiation having been completed, the second terminal performing decoding by using the negotiated encoding algorithm.

In order to implement the above purpose, a certain embodiment of the present invention further provides a terminal, comprising: an encoder, a decoder and a storage module; wherein, the storage module is configured to store a negotiation identifier indicating whether negotiation is completed;

the encoder is configured to encode media data by using a baseline algorithm and then transmit the encoded media data if the negotiation identifier indicates that the negotiation is uncompleted when performing encoding, the transmitted data packets carrying an encoding algorithm capability set supported by a codec of the present terminal at the utmost and an indication of the negotiation being uncompleted for an opposite terminal to obtain the negotiated encoding algorithm, and encode the media data by using the negotiated encoding algorithm and then transmit the encoded media data, wherein the negotiated encoding algorithm is an intersection of an encoding algorithm capability set supported by the codec of the present terminal at the utmost and an encoding algorithm capability set supported by a codec of the opposite terminal at the utmost, and the data packets transmitted by the opposite terminal carry the negotiated encoding algorithm and the indication of the negotiation having been completed; and the decoder is configured to notify the negotiated encoding algorithm to the encoder and set the negotiation identifier as the negotiation having been completed when receiving the data packets which are transmitted by the opposite terminal and carry the negotiated encoding algorithm and the indication of the negotiation having been completed.

The decoder is further configured to perform decoding by using the negotiated encoding algorithm when receiving the data packets which are transmitted by the opposite terminal and carry the negotiated encoding algorithm and the indication of the negotiation having been completed.

The encoder is further configured to encode the media data by using the negotiated encoding algorithm and then transmit the encoded media data if the negotiation identifier stored in the storage module indicates that the negotiation has been completed when performing encoding, the transmitted data packets carrying the negotiated encoding algorithm and the indication of the negotiation having been completed.

In the above terminal, the negotiated encoding algorithm and the encoding algorithm capability set supported by the codec at the utmost are carried by an encoding header of the transmitted data packets; and the indication of the negotiation having been completed and the indication of the negotiation being uncompleted are carried by a packet header of the transmitted data packets.

In order to implement the above purpose, a certain embodiment of the present invention further provides a terminal, comprising: an encoder, a decoder and a storage module; wherein, the storage module is configured to store a negotiation identifier indicating whether negotiation is completed;

the decoder is configured to, when receiving the data packets which are transmitted by the opposite terminal and carry the encoding algorithm capability set supported by the codec of the opposite terminal at the utmost and an indication of the negotiation being uncompleted, calculate an intersection of an encoding algorithm capability set supported by a codec of the present terminal at the utmost and an encoding algorithm capability set supported by a codec of an opposite terminal at the utmost to obtain the negotiated encoding algorithm, and notify the negotiated encoding algorithm to the encoder and set the negotiation identifier as the negotiation having been completed; and the encoder is configured to encode media data by using the negotiated encoding algorithm and then transmit the encoded media data, the transmitted data packets carrying the negotiated encoding algorithm and the indication of the negotiation having been completed for the opposite terminal to obtain the negotiated encoding algorithm.

The decoder is further configured to perform decoding by using a baseline algorithm when receiving the data packets which are transmitted by the opposite terminal and carry the indication of the negotiation being uncompleted; and the decoder is further configured to perform decoding by using the negotiated encoding algorithm when receiving the data packets which are transmitted by the opposite terminal and carry the indication of the negotiation having been completed.

Compared with the related art, the beneficial effects of the present invention are as follows:

the present invention can complete the codec capability negotiation directly according to the locally stored codec negotiation identifier and the related information carried in the data packets without using signaling means, i.e. implementing codec capability self-negotiation, thus enhancing the flexibility of the encoding algorithm selection. After the codec capability negotiation is completed, the terminals can use an encoding algorithm which is supported by each other (including optional encoding algorithms in the encoding standard specifications), which largely ensures the maximum codec capability utilization and maximum bandwidth utilization of the terminal, thus being able to improve the quality of audio or video communication between terminals, and enhancing user experience of the terminal.

PREFERRED EMBODIMENTS OF THE PRESENT INVENTION

In order to make the purposes, technical schemes and advantages of the present invention more clear, the present invention will be described in detail in conjunction with accompanying drawings and specific embodiments hereinafter.

Figure 1:
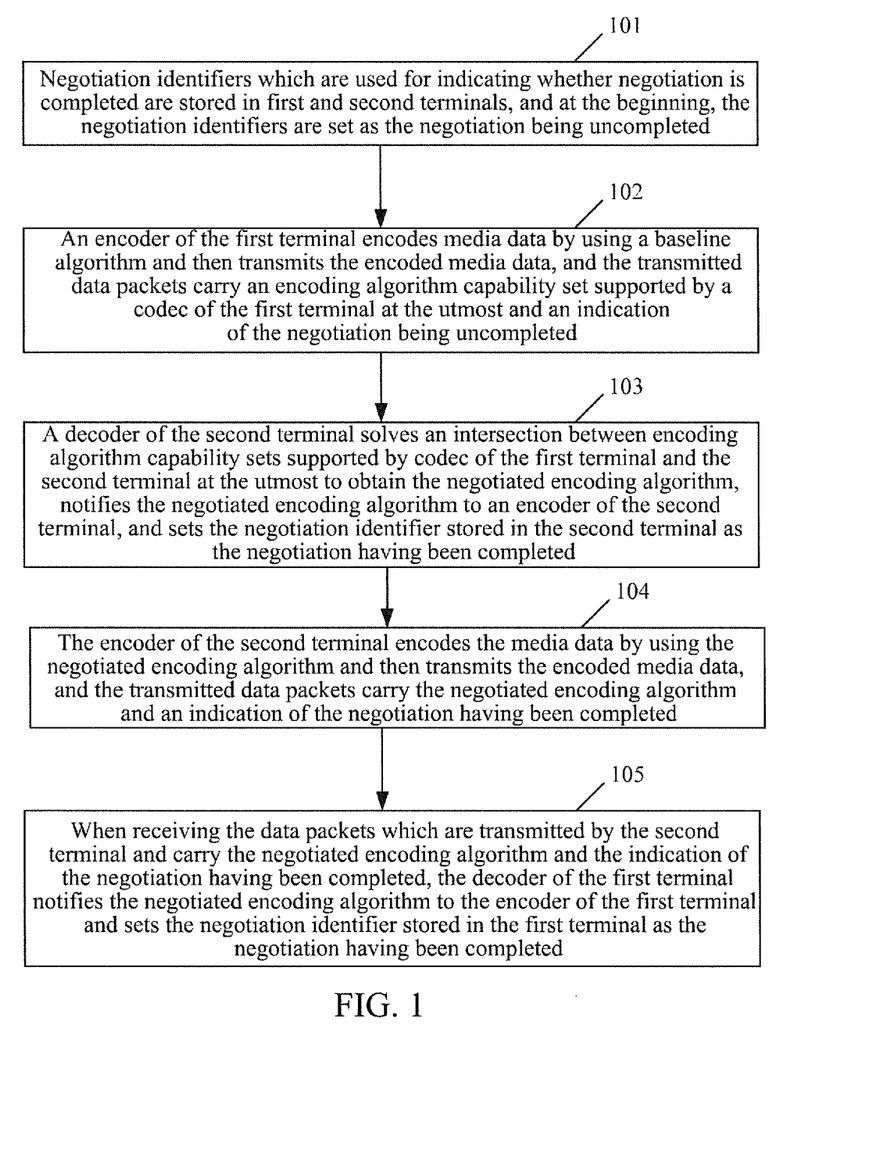
FIG. 1 is a flowchart of a codec capability negotiation method according to an embodiment of the present invention.

With respect to FIG. 1, a codec capability negotiation method according to an embodiment of the present invention comprises the following steps.

In step 101, negotiation identifiers which are used for indicating whether negotiation is completed are stored in first and second terminals, and at the beginning, the negotiation identifiers are set as the negotiation being uncompleted;

in step 102, an encoder of the first terminal encodes media data by using a baseline algorithm and then transmits the encoded media data, and the transmitted data packets carry an encoding algorithm capability set supported by a codec of the first terminal at the utmost and an indication of the negotiation being uncompleted;

in step 103, after receiving the data packets which are transmitted by the first terminal and carry the encoding algorithm capability set supported by the codec of the first terminal at the utmost and the indication of the negotiation being uncompleted, a decoder of the second terminal calculates an intersection of encoding algorithm capability sets supported by codecs of the first terminal and second terminal at the utmost, obtains the negotiated encoding algorithm, notifies the negotiated encoding algorithm to an encoder of the second terminal, and sets the negotiation identifier stored in the second terminal as the negotiation having been completed;

in the present step, the decoder of the second terminal decodes the data packets transmitted by the first terminal by using a baseline algorithm;

in step 104, the encoder of the second terminal encodes the media data by using the negotiated encoding algorithm and then transmits the encoded media data, and the transmitted data packets carry the negotiated encoding algorithm and an indication of the negotiation having been completed;

in step 105, when receiving the data packets which are transmitted by the second terminal and carry the negotiated encoding algorithm and the indication of the negotiation having been completed, the decoder of the first terminal notifies the negotiated encoding algorithm to the encoder of the first terminal and sets the negotiation identifier stored in the first terminal as the negotiation having been completed;

in the present step, the decoder of the first terminal decodes the data packets transmitted by the second terminal by using the negotiated encoding algorithm.

So far, the codec capability negotiation between the first terminal and the second terminal is completed, and in the subsequent communication process, the negotiated encoding algorithm will be used for encoding and decoding.

In the specific implementation, the negotiated encoding algorithm and the encoding algorithm capability set supported by the codec at the utmost are carried by an encoding header of the transmitted data packets; and the indication of the negotiation having been completed and the indication of the negotiation being uncompleted are carried by a packet header of the transmitted data packets. It can be understood that the information can also be carried by other fields in the transmitted data packets, which is not limited by the present invention.

Figure 2:
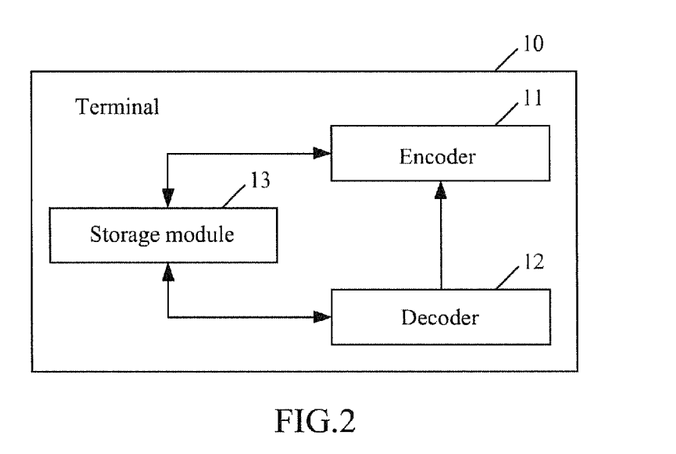
FIG. 2 is a structural schematic diagram of a terminal according to an embodiment of the present invention.

With respect to FIG. 2, a terminal 10 according to an embodiment of the present invention comprises an encoder 11, a decoder 12 and a storage module 13; wherein, the storage module 13 is configured to store a codec negotiation identifier (a negotiation identifier for short) indicating whether negotiation is completed, for example, the negotiation identifier being TRUE (right) represents that the codec capability negotiation of the present terminal has been completed, and the negotiation identifier being FALSE (wrong) represents that the codec capability negotiation of the present terminal is uncompleted;

The encoder 11 is configured to when performing encoding, encode media data (audio data, video data and so on) by using the negotiated encoding algorithm and then transmit the encoded media data if the negotiation identifier stored in the storage module indicates that the negotiation has been completed, wherein, the transmitted data packets carry the negotiated encoding algorithm and an indication of the negotiation having been completed; and encode the media data by using an encoding algorithm mandated to be implemented in encoding standard specifications (i.e. a baseline algorithm) and then transmit the encoded media data if the negotiation identifier indicates that the negotiation is uncompleted, wherein the transmitted data packets carry an encoding algorithm capability set supported by a codec of the terminal at the utmost and an indication of the negotiation being uncompleted;

the decoder 12 is configured to judge whether the received data packets carry the indication of the negotiation having been completed if the negotiation identifier indicates that the negotiation is uncompleted when receiving the data packets, and if the received data packets carry the indication of the negotiation having been completed, notify the negotiated encoding algorithm carried in the received data packets to the encoder 11, and set the negotiation identifier as the negotiation having been completed; otherwise, calculate an intersection of an encoding algorithm capability set supported by codec of the present terminal at the utmost and an encoding algorithm capability set supported by codec of an opposite terminal at the utmost carried in the received data packets to obtain the negotiated encoding algorithm, notify the negotiated encoding algorithm to the encoder 11 and set the negotiation identifier as the negotiation having been completed.

Wherein, the negotiated encoding algorithm and the encoding algorithm capability set supported by the codec at the utmost can be carried by an encoding header of the transmitted data packets; and the indication of the negotiation having been completed and the indication of the negotiation being uncompleted can be carried by a packet header of the transmitted data packets.

The terminal according to the embodiment of the present invention can complete the codec capability negotiation directly according to the locally stored codec negotiation identifier and the related information carried in the data packets without using signaling means, i.e. implementing codec capability self-negotiation, thus enhancing the flexibility of the encoding algorithm selection.

Further, when the decoder in the terminal according to the embodiment of the present invention performs decoding, if the received data packets carry the indication of the negotiation having been completed, the decoding is performed by using the negotiated encoding algorithm carried in the received data packets; and if the received data packets carry the indication of the negotiation being uncompleted, the decoding is performed by using the baseline algorithm.

Figure 3:
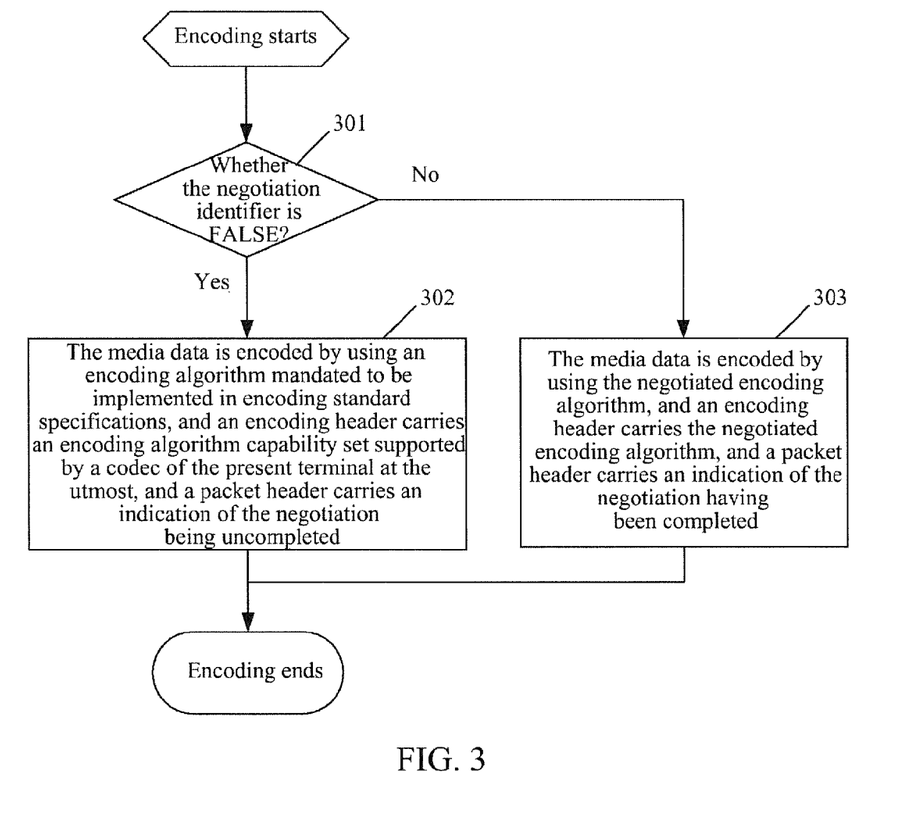
FIG. 3 is a schematic diagram of an operating process of an encoder in a terminal according to an embodiment of the present invention.

FIG. 3 is a schematic diagram of an operating process of an encoder in a terminal according to an embodiment of the present invention. With respect to FIG. 3, the operating process of the encoder comprises the following steps.

In step 301, when the encoder starts encoding operations, whether the locally stored codec negotiation identifier is FALSE is firstly judged, and if the negotiation identifier is FALSE, proceed to step 302; and if the negotiation identifier is TRUE, proceed to step 303;

in step 302, the locally stored negotiation identifier being FALSE represents that the codec capability negotiation of the present terminal is uncompleted, and the encoder encodes media data (audio data, video data and so on) by using an encoding algorithm mandated to be implemented in encoding standard specifications (i.e. a baseline algorithm) and then transmits the encoded media data, and an encoding header of the transmitted data packets carries an encoding algorithm capability set supported by a codec of the present terminal at the utmost, and a packet header of the transmitted data packets carries an indication of the negotiation being uncompleted, and the encoding ends;

in step 303, the locally stored negotiation identifier being TRUE represents that the codec capability negotiation of the present terminal has been completed, and the encoder encodes the media data by using the negotiated encoding algorithm and then transmits the encoded media data, and the encoding header of the transmitted data packets carries the negotiated encoding algorithm, and the packet header of the transmitted data packets carries an indication of the negotiation having been completed.

Figure 4:
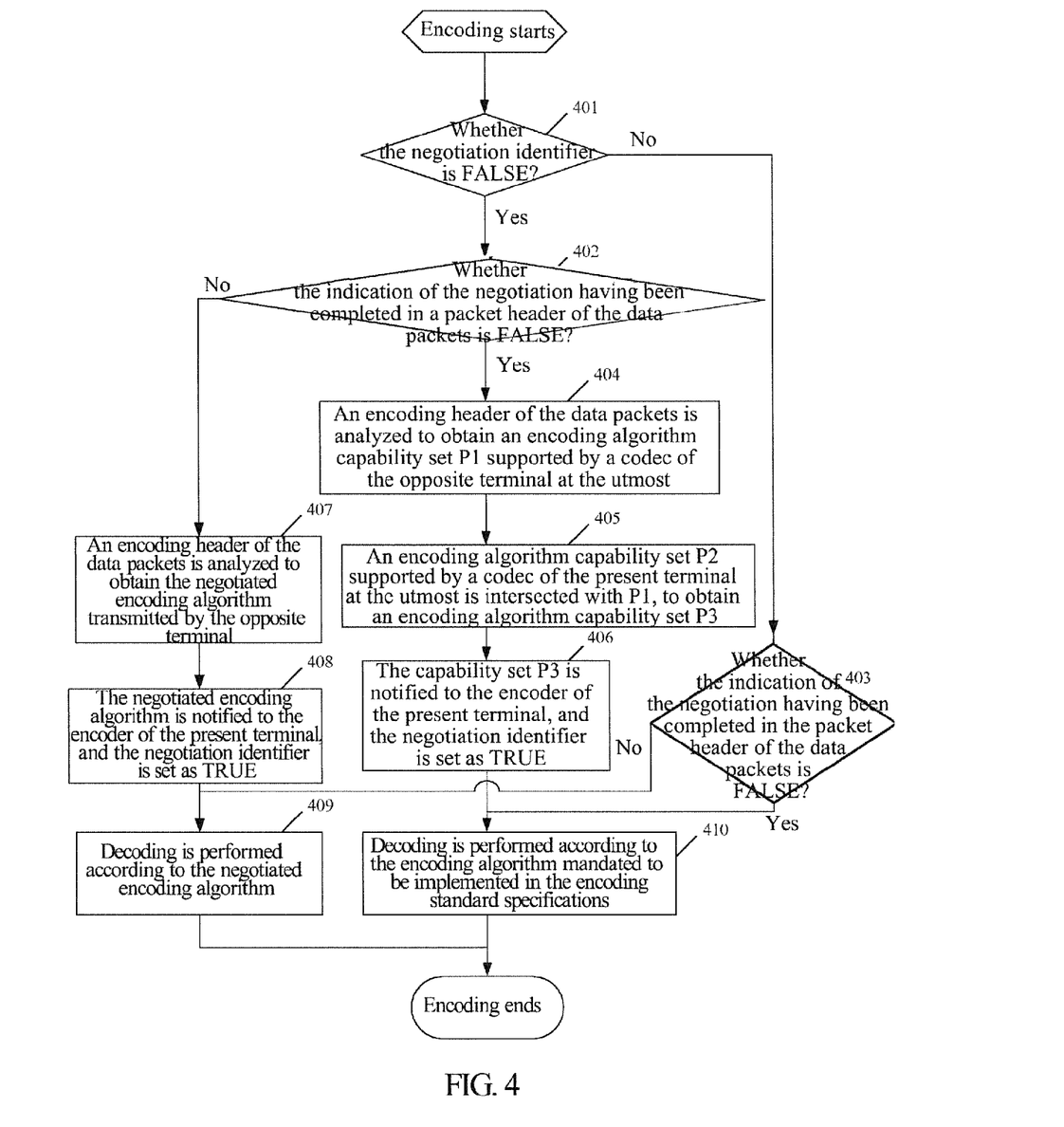
FIG. 4 is a schematic diagram of an operating process of a decoder in a terminal according to an embodiment of the present invention.

FIG. 4 is a schematic diagram of an operating process of a decoder in a terminal according to an embodiment of the present invention. With respect to FIG. 4, the operating process of the decoder comprises the following steps.

In step 401, after the present terminal receives audio or video data packets transmitted by an opposite terminal, a decoder of the present terminal firstly judges the locally stored codec negotiation identifier, and if the negotiation identifier is FALSE, proceed to step 402; and if the negotiation identifier is TRUE, proceed to step 403;

in step 402, the locally stored negotiation identifier being FALSE represents that the codec capability negotiation of the present terminal is uncompleted, and the decoder of the present terminal obtains an indication of the negotiation having been completed by analyzing a packet header of the received data packets, and if the indication of the negotiation having been completed is FALSE, proceed to step 404; and if the indication of the negotiation having been completed is TRUE, proceed to step 407;

in step 403, the locally stored negotiation identifier being TRUE represents that the codec capability negotiation of the present terminal has been completed, and the decoder of the present terminal obtains an indication of the negotiation having been completed by analyzing a packet header of the received data packets, and if the indication of the negotiation having been completed is FALSE, proceed to step 410; and if the indication of the negotiation having been completed is TRUE, proceed to step 409;

in step 404, the indication of the negotiation having been completed being FALSE represents that the codec capability negotiation of the opposite terminal is uncompleted, and the decoder of the present terminal obtains an encoding algorithm capability set P1 supported by a codec of the opposite terminal at the utmost by analyzing an encoding header of the received data packets;

in step 405, an encoding algorithm capability set P2 supported by a codec of the present terminal at the utmost is intersected with P1, to obtain an encoding algorithm capability set P3, which is used as the negotiated encoding algorithm;

in step 406, the negotiated encoding algorithm is notified to the encoder of the present terminal, and the negotiation identifier of the codec of the present terminal is set as TRUE, and the codec capability negotiation process of the present terminal is completed, and then proceed to a decoding process of step 410;

in step 407, the indication of the negotiation having been completed being TRUE represents that the codec capability negotiation of the opposite terminal has been completed, and the decoder of the present terminal obtains the negotiated encoding algorithm transmitted by the opposite terminal by analyzing an encoding header of the received data packets;

in step 408, the negotiated encoding algorithm is notified to the encoder of the present terminal, and the codec negotiation identifier of the present terminal is set as TRUE, and the codec capability negotiation process of the present terminal is completed, and then proceed to a decoding process of step 409;

in step 409, the indication of the negotiation having been completed being TRUE represents that the codec capability negotiation of the opposite terminal has been completed, which illustrates that it is the negotiated encoding algorithm that is used by the encoder of the opposite terminal, and therefore, the decoder of the present terminal performs decoding according to the encoding algorithm (i.e. the negotiated encoding algorithm) carried in the encoding header of the received data packets;

in step 410, the indication of the negotiation having been completed being FALSE represents that the codec capability negotiation of the opposite terminal is uncompleted, which illustrates that it is the encoding algorithm mandated to be implemented in the encoding standard specifications that is used by the encoder of the opposite terminal, and therefore, the decoder of the present terminal decodes the received data packets according to the encoding algorithm mandated to be implemented in the encoding standard specifications.

An application example of performing a media session between terminals according to an embodiment of the present invention will be provided hereinafter.

Figure 5:
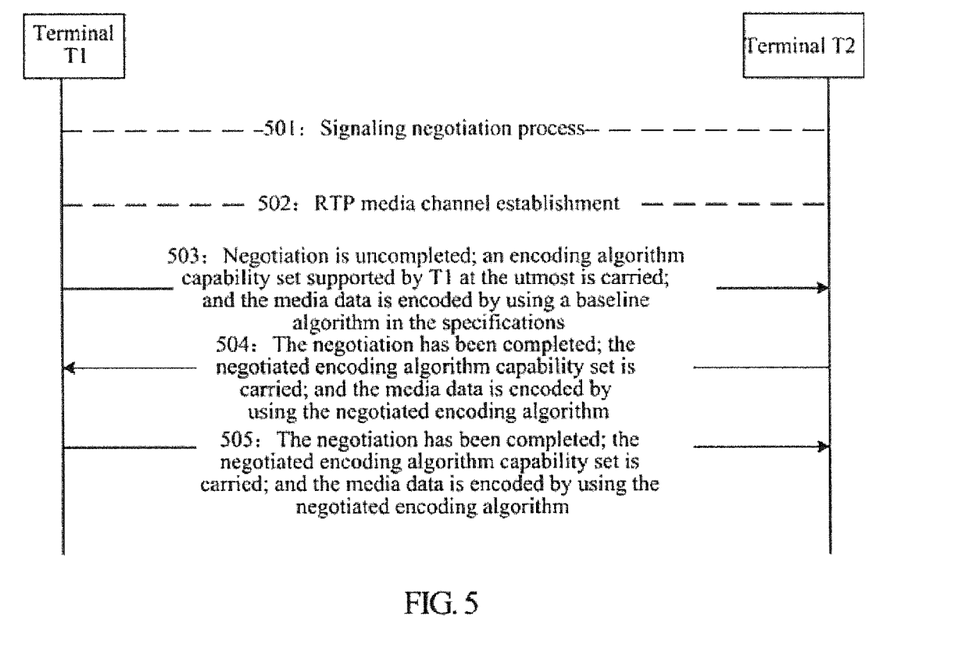
FIG. 5 is a schematic diagram of performing a media session between terminals according to an embodiment of the present invention.

With respect to FIG. 5, a process of the media session performed between a terminal T1 and a terminal T2 primarily comprises the following steps.

In step 501, the terminal T1 and the terminal T2 select an encoding type through a signaling negotiation process;

it should be illustrated that only the encoding type is negotiated through the signaling in the present step instead of the encoding algorithm. As described above, in various encoding standard specifications, except for the encoding algorithm mandated to be implemented by the specifications, there are some optional encoding algorithms, and therefore, in the subsequent steps, the encoding algorithm also will be negotiated by means of non-signaling;

in step 502, a Real-time Transport Protocol (RTP) media channel is established between the terminal T1 and the terminal T2, and the codec negotiation identifiers of the terminal T1 and the terminal T2 are initialized as FALSE, and the audio or video session process is started;

in step 503, when the terminal T1 needs to transmit a first RTP data packet to the terminal T2, at this time, the codec negotiation identifier of the terminal T1 being FALSE represents that the codec capability negotiation of the terminal T1 is uncompleted, and the encoder of the terminal T1 encodes media data by using the encoding algorithm mandated to be implemented in the encoding standard specifications and then transmits the encoded media data, wherein, an encoding header of the transmitted data packets carries an encoding algorithm capability set P1 supported by a codec of the first terminal T1 at the utmost, and a packet header of the transmitted data packets carries an indication of the negotiation being uncompleted;

in step 504, when the terminal T2 receives the first RTP data packet transmitted by the terminal T1, at this time, the codec negotiation identifier of the terminal T2 being FALSE represents that the codec capability negotiation of the terminal T2 is uncompleted, and therefore, the decoder of the terminal T2 obtains the indication of the negotiation having been completed by analyzing the packet header of the received data packets, and at this time, the indication of the negotiation having been completed being FALSE represents that the codec capability negotiation of the terminal T1 is uncompleted, and the encoding algorithm capability set P1 supported by the terminal T1 at the utmost is obtained by continuing to analyze the encoding header of the received data packets, and the terminal T2 uses the encoding algorithm capability set P2 supported by itself at the utmost to intersect with P1, to obtain an encoding algorithm capability set P3 supported by both the terminal T1 and the terminal T2, and P3 used as the negotiated encoding algorithm is notified to the encoder of the terminal T2, and the codec negotiation identifier of the terminal T2 being TRUE is modified;

the encoder of the terminal T2 uses the encoding algorithm in P3 in the subsequent encoding process, and carries the encoding algorithm in P3 in the encoding header of the RTP data packets, and carries the indication of the negotiation having been completed in the packet header of the RTP data packets;

in the present step, as the terminal T2 learns that the codec capability negotiation of the terminal T1 is uncompleted, it can be determined that the encoder of the terminal T1 performs encoding by using the encoding algorithm mandated to be implemented in the encoding standard specifications, and therefore, the decoder of the terminal T2 decodes the received data packets by using the encoding algorithm mandated to be implemented in the encoding standard specifications;

in step 505, the terminal T1 receives the RTP data packets transmitted by the terminal T2, and at this time, the codec negotiation identifier of the terminal T1 being FALSE represents that the codec capability negotiation of the terminal T1 is uncompleted, and the decoder of the terminal T1 learns that the negotiation of the terminal T2 has been completed by analyzing the indication of the negotiation having been completed carried in the packet header of the received data packets, and then the negotiated encoding algorithm is obtained by continuing to analyze the encoding header of the received data packets, and the negotiated encoding algorithm which is obtained is notified to the encoder of the terminal T1, and the codec negotiation identifier of the terminal T1 being TRUE is modified, and the encoder of the terminal T1 uses the negotiated encoding algorithm in the subsequent encoding process.

It can be known from the above description of the embodiments of the present invention that, according to the technical schemes provided by the embodiments of the present invention, when the terminal determines that the codec capability negotiation of the present terminal is uncompleted, i.e. the codec negotiation identifier of the terminal is FALSE, the encoder uses the encoding algorithm mandated to be implemented in the encoding standard specifications to ensure that the received audio or video data can be decoded normally by the opposite terminal. Such method is extremely important for video communication.

In the video encoding algorithm, in order to improve bandwidth utilization, a "key frame" compression algorithm is used, wherein, the key frame is to perform compression encoding on a full image, while a non-key frame (a predictive frame) is to compress data for different points of the current image and adjacent images, and when receiving the non-key frame and performing decoding operations, the decoder needs to refer to data of the adjacent images. In the video communication, the key frames and the non-key frames (predictive frames) are normally transmitted alternately, and the first frame is necessarily a key frame, and if the first frame is lost or the decoding of the receiving terminal fails, it will necessarily result in a large reduction of the video quality of the receiving terminal. Therefore, before the codec capability negotiation is completed, the quality of the video communication between terminals can be largely ensured by using the encoding algorithm mandated to be implemented by the encoding standard specifications.

According to the technical schemes provided by the embodiments of the present invention, when receiving the data packets of the opposite terminal and performing decoding operations, the terminal needs to firstly judge the indication of the negotiation having been completed carried in the packet header of the data packets. If the negotiation is uncompleted, it indicates that it is the encoding algorithm mandated to be implemented in the encoding standard specifications that is used by the audio or video data carried in the data packets; and if the negotiation has been completed, it indicates that it is the negotiated encoding algorithm that is used by the audio or video data carried in the data packets. With such mode, it can be ensured that the audio or video data packets transmitted by the terminal in the process of the codec capability negotiation can be normally decoded by the opposite party.

According to the technical schemes provided by the embodiments of the present invention, after the codec capability negotiation is completed, the terminals can ensure the flexibility of the encoding algorithm selection by using an encoding algorithm which can be supported by each other, which largely ensures the maximum codec capability utilization and maximum bandwidth utilization of the terminal and is able to improve the quality of audio or video communication between terminals and enhances user experience of the terminal.

At last, it should be illustrated that the above embodiments are only used to illustrate the technical schemes of the present invention without limitation, and ordinary people skilled in the art should understand that modifications or equivalent substitutions can be made on the technical schemes of the present invention without departing from the spirit scope of the technical schemes of the present invention, all of which should be contained within the scope of the claims of the present invention.

What is claimed is:

1. A codec capability negotiation method, comprising:

storing a negotiation identifier which is used for indicating whether negotiation is completed in a first terminal and setting the negotiation identifier as the negotiation being uncompleted;

an encoder of the first terminal encoding media data by using a baseline algorithm and then transmitting the encoded media data, and transmitted data packets carrying an encoding algorithm capability set supported by a codec of the first terminal at the utmost and an indication of the negotiation being uncompleted for a second terminal to obtain a negotiated encoding algorithm and encode media data by using the negotiated encoding algorithm and then transmit the encoded media data, wherein the baseline algorithm establishes standard specifications to be implemented by the negotiated encoding algorithm, and further wherein the negotiated encoding algorithm is an intersection of encoding algorithm capability sets supported by codecs of the first terminal and the second terminal at the utmost, and data packets transmitted by the second terminal carry the negotiated encoding algorithm and an indication of the negotiation having been completed;

when receiving the data packets which are transmitted by the second terminal and carry the negotiated encoding algorithm and the indication of the negotiation having been completed, a decoder of the first terminal notifying the negotiated encoding algorithm to the encoder and setting the negotiation identifier as the negotiation having been completed, wherein after receiving the data packets which are transmitted by the second terminal and carry the negotiated encoding algorithm and the indication of the negotiation having been completed, the decoder of the first terminal performing decoding by using the negotiated encoding algorithm;

when performing encoding, the encoder of the first terminal encoding the media data by using the negotiated encoding algorithm and then transmitting the encoded media data if the negotiation identifier indicates that the negotiation has been completed, and the transmitted data packets carrying the negotiated encoding algorithm and the indication of the negotiation having been completed;

when receiving the data packets which are transmitted by the first terminal and carry the indication of the negotiation being uncompleted, the second terminal performing decoding by using the baseline algorithm; and when receiving the data packets which are transmitted by the first terminal and carry the indication of the negotiation having been completed, the second terminal performing decoding by using the negotiated encoding algorithm.

2. The codec capability negotiation method according to claim 1, wherein, the negotiated encoding algorithm and the encoding algorithm capability set supported by the codec at the utmost are carried by an encoding header of the transmitted data packets; and the indication of the negotiation having been completed and the indication of the negotiation being uncompleted are carried by a packet header of the transmitted data packets.

3. A codec capability negotiation method, comprising:

storing a negotiation identifier which is used for indicating whether negotiation is completed in a second terminal and setting the negotiation identifier as the negotiation being uncompleted;

when receiving data packets which are transmitted by a first terminal and carry an encoding algorithm capability set supported by a codec of the first terminal at the utmost and an indication of the negotiation being uncompleted, a decoder of the second terminal calculating an intersection of encoding algorithm capability sets supported by codecs of the first terminal and the second terminal at the utmost to obtain a negotiated encoding algorithm, and notifying the negotiated encoding algorithm to an encoder of the second terminal and setting the negotiation identifier as the negotiation having been completed;

when receiving the data packets which are transmitted by the first terminal and carry the indication of the negotiation being uncompleted, the second terminal performing decoding by using a baseline algorithm, wherein the baseline algorithm establishes standard specifications to be implemented by the negotiated encoding algorithm;

the encoder of the second terminal encoding media data by using the negotiated encoding algorithm and then transmitting the encoded media data, and transmitted data packets carrying the negotiated encoding algorithm and an indication of the negotiation having been completed for the first terminal to obtain the negotiated encoding algorithm;

when receiving the data packets which are transmitted by the first terminal and carry the indication of the negotiation having been completed, the second terminal performing decoding by using the negotiated encoding algorithm; and after obtaining the negotiated encoding algorithm, the first terminal setting the negotiation identifier stored in the first terminal as the negotiation having been completed, and encoding the media data by using the negotiated encoding algorithm and then transmitting the encoded media data, and the transmitted data packets carrying the negotiated encoding algorithm and the indication of the negotiation having been completed.

4. A networked system of terminals, comprising:

a first terminal and a second terminal, each of the first terminal and the second terminal comprising: an encoder, a decoder and a storage module; wherein, the storage module of the first terminal is configured to store a negotiation identifier indicating whether negotiation between the first terminal and the second terminal is completed;

the encoder of the first terminal is configured to encode media data by using a baseline algorithm and then transmit, as transmitted data packets, the encoded media data to the second terminal if the negotiation identifier indicates that the negotiation is uncompleted when performing encoding, the transmitted data packets carrying an encoding algorithm capability set supported by a codec of the first terminal at the utmost and an indication of the negotiation being uncompleted for the second terminal to obtain a negotiated encoding algorithm, and to encode the media data by using the negotiated encoding algorithm and then transmit the encoded media data, wherein, the negotiated encoding algorithm is an intersection of an encoding algorithm capability set supported by the codec of the first terminal at the utmost and an encoding algorithm capability set supported by a codec of the second terminal at the utmost, and data packets transmitted by the second terminal carry the negotiated encoding algorithm and an indication of the negotiation having been completed, wherein the baseline algorithm establishes standard specifications to be implemented by the negotiated encoding algorithm, and further wherein the encoder of the first terminal is further configured to encode the media data by using the negotiated encoding algorithm and then transmit the encoded media data if the negotiation identifier stored in the storage module of the first terminal indicates that the negotiation has been completed when performing encoding, the transmitted data packets carrying the negotiated encoding algorithm and the indication of the negotiation having been completed; and the decoder of the first terminal is configured to notify the negotiated encoding algorithm to the encoder of the first terminal and set the negotiation identifier as the negotiation having been completed when receiving the data packets which are transmitted by the second terminal and carry the negotiated encoding algorithm and the indication of the negotiation having been completed, wherein the decoder of the first terminal is further configured to perform decoding by using the negotiated encoding algorithm when receiving the data packets which are transmitted by the second terminal and carry the negotiated encoding algorithm and the indication of the negotiation having been completed.

5. The system according to claim 4, wherein,
the negotiated encoding algorithm and the encoding algorithm capability set supported by the codec at the utmost are carried by an encoding header of the transmitted data packets; and the indication of the negotiation having been completed and the indication of the negotiation being uncompleted are carried by a packet header of the transmitted data packets.

6. The system according to claim 4, wherein
the storage module of the second terminal is configured to store a negotiation identifier indicating whether negotiation is completed;

the decoder of the second terminal is configured to, when receiving data packets which are transmitted by the first terminal and carry an encoding algorithm capability set supported by a codec of the first terminal at the utmost and an indication of the negotiation being uncompleted, calculate an intersection of an encoding algorithm capability set supported by a codec of the first terminal at the utmost and the encoding algorithm capability set supported by the codec of the first terminal at the utmost to obtain a negotiated encoding algorithm, and notify the negotiated encoding algorithm to the encoder of the second terminal and set the negotiation identifier as the negotiation having been completed;

wherein the decoder of the second terminal is further configured to perform decoding by using a baseline algorithm when receiving the data packets which are transmitted by the first terminal and carry the indication of the negotiation being uncompleted, wherein the baseline algorithm establishes standard specifications to be implemented by the negotiated encoding algorithm; and further wherein the decoder of the second terminal is further configured to perform decoding by using the negotiated encoding algorithm when receiving the data packets which are transmitted by the first terminal and carry the indication of the negotiation having been completed; and the encoder of the second terminal is configured to encode media data by using the negotiated encoding algorithm and then transmit the encoded media data, transmitted data packets carrying the negotiated encoding algorithm and an indication of the negotiation having been completed for the first terminal to obtain the negotiated encoding algorithm.

7. A networked system of terminals, comprising:
a first terminal and a second terminal, each of the first terminal and the second terminal, comprising:
an encoder, a decoder and a storage module; wherein, the storage module of the second terminal is configured to store a negotiation identifier indicating whether negotiation is completed;

the decoder of the second terminal is configured to: when receiving data packets which are transmitted by the first terminal and carry an encoding algorithm capability set supported by a codec of the first terminal at the utmost and an indication of the negotiation being uncompleted, calculate an intersection of an encoding algorithm capability set supported by a codec of the first terminal at the utmost and the encoding algorithm capability set supported by the codec of the first terminal at the utmost to obtain a negotiated encoding algorithm, and notify the negotiated encoding algorithm to the encoder of the second terminal and set the negotiation identifier as the negotiation having been completed;

wherein the decoder of the second terminal is further configured to perform decoding by using a baseline algorithm when receiving the data packets which are transmitted by the first terminal and carry the indication of the negotiation being uncompleted, wherein the baseline algorithm establishes standard specifications to be implemented by the negotiated encoding algorithm; and further wherein the decoder of the second terminal is further configured to perform decoding by using the negotiated encoding algorithm when receiving the data packets which are transmitted by the first terminal and carry the indication of the negotiation having been completed and the encoder of the second terminal is configured to encode media data by using the negotiated encoding algorithm and then transmit the encoded media data, transmitted data packets carrying the negotiated encoding algorithm and an indication of the negotiation having been completed for the first terminal to obtain the negotiated encoding algorithm.

* * * * *

UNITED STATES PATENT AND TRADEMARK OFFICE
CERTIFICATE OF CORRECTION

| | | |
|---|---|---|
| PATENT NO. | : 8,953,671 B2 | Page 1 of 1 |
| APPLICATION NO. | : 13/513050 | |
| DATED | : February 10, 2015 | |
| INVENTOR(S) | : Kai Liao, Dong Wang and Xi Zuo | |

It is certified that error appears in the above-identified patent and that said Letters Patent is hereby corrected as shown below:

In the Specification

In Column 2, Line 27, before "comprises:" please delete "further".

In Column 2, Line 34, before "comprises:" please delete "further".

In Column 2, Line 43, before "comprises:" please delete "further".

In Column 3, Line 17, before "comprises:" please delete "further".

In Column 3, Line 23, before "comprises:" please delete "further".

In Column 3, Line 33, before "comprises:" please delete "further".

Signed and Sealed this
Second Day of June, 2015

Michelle K. Lee
*Director of the United States Patent and Trademark Office*